(12) United States Patent
Kumar et al.

(10) Patent No.: US 9,842,095 B2
(45) Date of Patent: Dec. 12, 2017

(54) CROSS-DEVICE DOCUMENT TRANSACTIONS

(71) Applicant: ADOBE SYSTEMS INCORPORATED, San Jose, CA (US)

(72) Inventors: Anup Kumar, Noida (IN); Ajay Jain, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/151,118

(22) Filed: May 10, 2016

(65) Prior Publication Data

US 2017/0329752 A1 Nov. 16, 2017

(51) Int. Cl.
*G06F 17/00* (2006.01)
*G06F 17/24* (2006.01)
*G06F 3/0488* (2013.01)
*G06F 17/22* (2006.01)

(52) U.S. Cl.
CPC ........ *G06F 17/241* (2013.01); *G06F 3/04883* (2013.01); *G06F 17/2288* (2013.01)

(58) Field of Classification Search
CPC .................................................. G06F 17/2288
See application file for complete search history.

(56) References Cited

U.S. PATENT DOCUMENTS

| | | | | |
|---|---|---|---|---|
| 5,784,610 A * | 7/1998 | Copeland, III | ... | G06F 17/30073 |
| 5,991,760 A * | 11/1999 | Gauvin | ............... | G06F 17/3056 |
| 7,600,124 B2 * | 10/2009 | Karimisetty | ...... | G06F 17/30911 |
| | | | | 713/176 |
| 8,370,434 B2 * | 2/2013 | Yoon | ...................... | G06Q 10/06 |
| | | | | 358/1.13 |
| 8,843,488 B1 * | 9/2014 | Chong | .............. | G06F 17/30882 |
| | | | | 707/736 |
| 8,868,916 B2 * | 10/2014 | Shapiro | ................. | H04L 9/3247 |
| | | | | 713/176 |
| 8,881,015 B2 * | 11/2014 | Jung | ...................... | G06Q 10/06 |
| | | | | 715/733 |

(Continued)

*Primary Examiner* — Laurie Ries
(74) *Attorney, Agent, or Firm* — Shook, Hardy & Bacon L.L.P.

(57) ABSTRACT

Systems and methods provide for optimizing transactions on digital documents between remote client devices. A digital document having one or more electronically annotatable objects resides on a host client device. A request is received to enable the digital document for cross-device transactions. Based on the request, a piece of metadata associated with the digital document is sent to a remote server device configured to host, among other things, the metadata associated with the digital document residing on the host client device. The metadata includes information about the digital document, some corresponding to electronically annotatable objects provided therein. A remote client device accessing the remote server device can view, among other things, the metadata associated with the digital document residing on the host client device. The remote client device obtains, in accordance with the metadata, one or more electronic annotations for transmission to the remote server device. The remote server device relays the one or more electronic annotations to the host client device, such that the one or more electronic annotations are associated with the digital document residing thereon.

20 Claims, 11 Drawing Sheets

(56) References Cited

U.S. PATENT DOCUMENTS

| | | | | |
|---|---|---|---|---|
| 9,268,758 B2* | 2/2016 | Gonser | | G06F 17/243 |
| 9,400,974 B2* | 7/2016 | O'Mara | | G06F 17/241 |
| 9,613,190 B2* | 4/2017 | Ford | | G06F 21/10 |
| 2003/0097640 A1* | 5/2003 | Abrams | | G06F 17/241 |
| | | | | 715/255 |
| 2003/0182578 A1* | 9/2003 | Warnock | | G06K 9/00469 |
| | | | | 713/176 |
| 2004/0201622 A1* | 10/2004 | Rhodes | | G06Q 10/10 |
| | | | | 715/751 |
| 2005/0044112 A1* | 2/2005 | Yamamoto | | G06F 17/30038 |
| 2005/0044483 A1* | 2/2005 | Maze | | H04L 29/06 |
| | | | | 715/205 |
| 2008/0177726 A1* | 7/2008 | Forbes | | G06Q 30/02 |
| 2008/0288857 A1* | 11/2008 | Duncan | | G06F 17/241 |
| | | | | 715/230 |
| 2009/0138528 A1* | 5/2009 | Manzano | | G06F 17/30174 |
| 2011/0296291 A1* | 12/2011 | Melkinov | | G06F 17/2229 |
| | | | | 715/229 |
| 2012/0084185 A1* | 4/2012 | Ciaramitaro | | G06Q 40/123 |
| | | | | 705/31 |
| 2012/0179702 A1* | 7/2012 | Nozaki | | G06F 17/3012 |
| | | | | 707/758 |
| 2012/0240026 A1* | 9/2012 | Iyer | | G06Q 10/10 |
| | | | | 715/231 |
| 2012/0317239 A1* | 12/2012 | Mulder | | G06Q 10/101 |
| | | | | 709/219 |
| 2013/0311868 A1* | 11/2013 | Monney | | G06F 17/30017 |
| | | | | 715/230 |
| 2014/0012832 A1* | 1/2014 | Kisin | | G06F 17/30598 |
| | | | | 707/711 |
| 2014/0047560 A1* | 2/2014 | Meyer | | G06F 21/62 |
| | | | | 726/28 |
| 2014/0129457 A1* | 5/2014 | Peeler | | G06Q 30/018 |
| | | | | 705/317 |
| 2015/0278168 A1* | 10/2015 | Hawa | | G06F 17/30581 |
| | | | | 715/205 |
| 2017/0024576 A1* | 1/2017 | Kinsel | | G06F 17/24 |

* cited by examiner

CROSS-DEVICE DOCUMENT TRANSACTIONS

BACKGROUND

Many computing device users generally employ more than one computing device to complete their workflows throughout any given day. For instance, a user may have different computing devices that remain within fixed locations at home and at work. The user may also carry a mobile device, such as a mobile phone, that remains on their person at all times.

With the advent of networks, such as the Internet, various technological advancements have enabled users to perform workflows across these devices. Such advancements have eliminated the concern for transferring workflow documents from a computing device to a portable storage device, and subsequently transferring (e.g., via the portable storage device) the workflow documents to other computing devices for continued modification thereon. In one aspect, documents can now be transferred from one computer to another computer, via email or cloud-based storage services, so users can easily access a most-current copy of a workflow document using multiple computing devices. For example, a user can review and/or modify a workflow document on a desktop computer at a work office, then save the workflow document for transfer and subsequent review and/or modification at a different location, such as a home office.

The problem with traditional cross-device workflows, however, is rooted in the inefficiencies associated with inter-device transfer of the workflow document. Transferring a workflow document between devices, oftentimes more than once, unnecessarily consumes network bandwidth, memory storage space, processing resources, and user time. For instance, the transfer of a workflow document between two or more devices consumes bandwidth associated with the negotiation between the devices, in addition to the transfer of the workflow document. The transfer also consumes processing and memory resources associated with each device, such as saving or storing the workflow document, sending or receiving the workflow document, and opening or closing the workflow document.

Moreover, when a document is transferred to a device and opened for modification thereon, the user must traverse the document to find the relevant portion of the document on which to perform the modification, which can take additional time. By way of example only, assume that a user receives a digital document that needs to be reviewed and electronically signed by the user. The user reviews the digital document on his work office computer, but has to leave before making a decision to electronically sign it. To extend his workflow across multiple devices, the user must be able to transfer the document from his work office computer to another device on which he must retrieve, open, review, and electronically sign the document.

The wide-spread adoption of cross-device workflow technologies reveals that cross-device workflow is a key productivity-enhancing factor in today's world. While traditional approaches are helpful in facilitating cross-device workflow, they still require that the workflow document be transferred between devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein relate to, among other things, optimizing cross-device workflows. In essence, embodiments are broadly directed to electronically annotating a digital workflow document from a computing device that is remote from a host client device on which the digital workflow document resides (i.e., stored in memory). In other words, digital workflow documents can be electronically annotated from a remote location, without necessitating the transfer of the document. In this way, embodiments described herein can optimize the implementation of cross-device workflows by enabling cross-device transactions that utilize less computing resources and generate less latency when compared to traditional cross-device workflows.

At a high level, a digital workflow document resides on a host computing device. A request is received to enable the digital document for cross-device transactions. In other words, a request is received to enable electronic annotation of a digital document by a remote client device while the digital document resides on the host computing device. Responsive to receiving the request, a piece of metadata associated with the digital document is sent to a remote server device for storage thereon. The remote client device establishes a connection with the remote server device to display, among other things, the piece of metadata associated with the digital document residing on the host client device. The remote client device receives a selection from the user that corresponds to the piece of metadata associated with the digital document. Based on the received selection corresponding to the piece of metadata associated with the digital document, the remote client device requests and obtains, from the user, one or more electronic annotations for association with the digital document residing on the host client device. The one or more electronic annotations are sent from the remote client device to the remote server device, where the remote server device relays the one or more electronic annotations back to the host client device for association with the digital document.

BRIEF DESCRIPTION OF THE DRAWINGS

The present invention is described in detail below with reference to the attached drawing figures, wherein.

DETAILED DESCRIPTION

Figure 1:
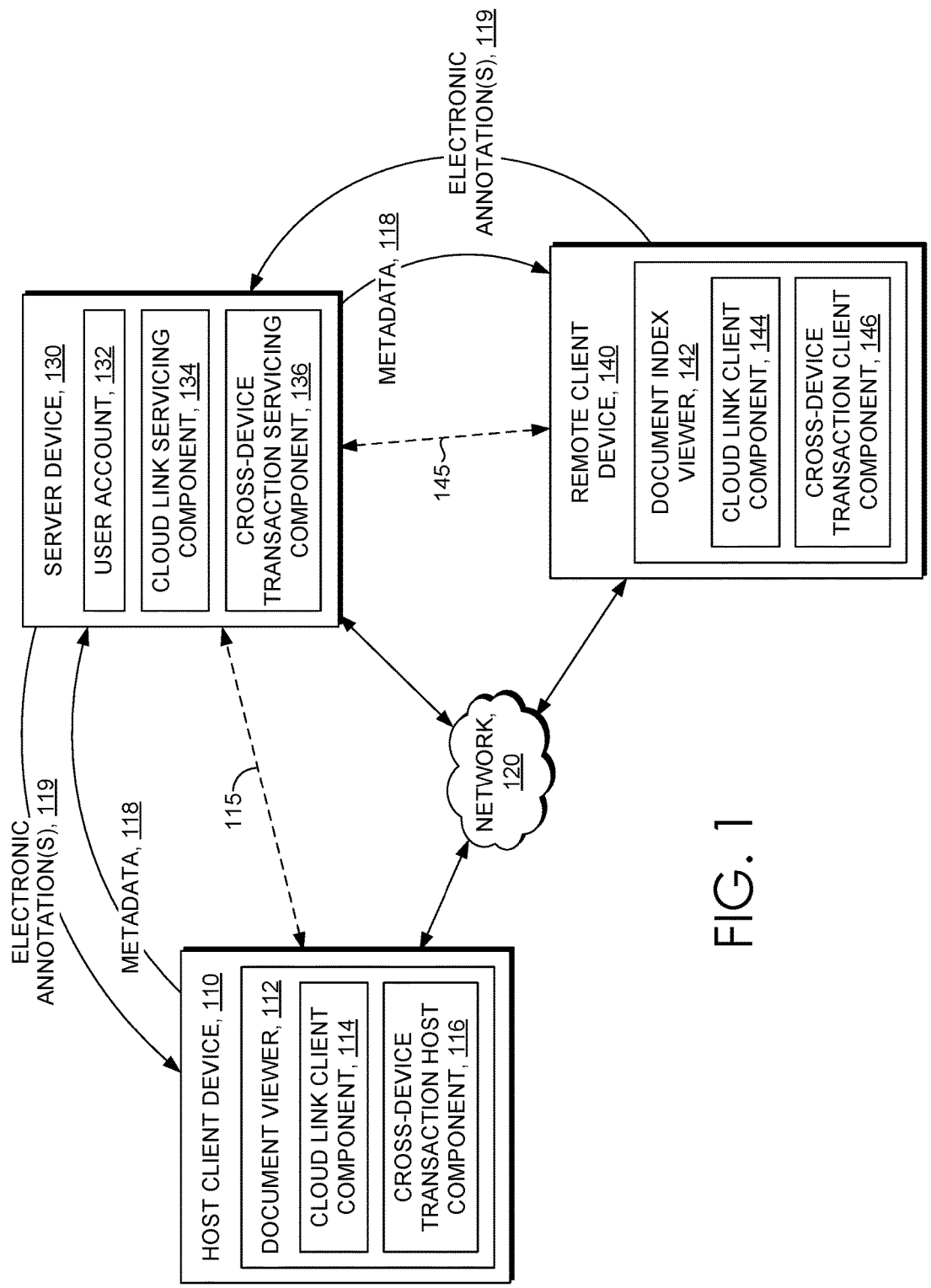
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein are directed to optimizing cross-device workflows by enabling cross-device transactions. For instance, a user can enable a workflow document residing on a host client device, or relevant portions thereof, to be modified via a remote client device without ever transmitting the document. In essence, only the metadata that identifies the workflow document is presented on the remote client device. In some embodiments, the metadata includes information describing the various electronic annotations that are available for the relevant portions of the workflow document. In this way, and in accordance with the foregoing example, a user can simply select a workflow document on a remote client device (e.g., by name) and electronically sign and/or annotate the workflow document from the remote client device. The electronic signature(s) and/or annotation(s) are sent from the remote client device, via a remote server device, back to the workflow document residing on the host client device for association with the relevant portion of the workflow document. In this way, embodiments described herein can optimize the implementation of cross-device workflows by utilizing fewer computing resources and decreasing latencies typically associated with cross-device document transactions.

In embodiments, a cross-device transaction relates to the selection, generation, and transmission of a digital workflow document modification, initiated from a remote client device, and sent a host client device to modify the digital workflow document residing thereon. In some embodiments, a digital workflow document residing on a host client device can be enabled for cross-device transactions from a remote client device that is remotely located relative to the host client device. Once enabled for cross-device transactions, metadata associated with the cross-device transaction-enabled workflow document is sent to a remote server device, while the cross-device transaction-enabled workflow document remains on the host client device. In essence, only the metadata, not the cross-device transaction-enabled workflow document itself, is transmitted in accordance with embodiments described herein.

The metadata is received by the remote server device and stored thereon. The metadata can include, among other things, identifying information (e.g., document name, size, modification time and/or date, etc.) that corresponds to the cross-device transaction-enabled workflow document. In some embodiments, the metadata can include references to relevant portions of the cross-device transaction-enabled workflow document configured to receive an electronic annotation. For instance, electronic signature blocks, annotations from other collaborative users, and/or pending changes in a workflow document are just some examples of objects that can receive corresponding electronic annotations. Once the remote server device receives the metadata, it is processed and at least the identifying information therein is added to a list of cross-device transaction-enabled workflow documents. In some embodiments, each cross-device transaction-enabled workflow document in the list may be accompanied with one or more action icons that each corresponds to one or more actions (e.g., electronic signature, comment, etc.) that correspond to relevant portions of the document.

Accordingly, in some embodiments, a remote client device (e.g., a mobile phone) utilizing a cross-device transaction application (hereinafter referenced as a "document index viewer") installed thereon, can establish an authenticated network connection with the remote server device and request the list of cross-device transaction-enabled workflow documents, among other things. The authenticated remote client device can receive the list, or the metadata associated with the cross-device transaction-enabled workflow documents, from the remote server device to provide for display the list and associated action icons. The authenticated remote client device can receive a selection, from the user, that corresponds to one of the cross-device transaction-enabled workflow documents or action icons thereof. In embodiments, the received selection initializes the presentation of a widget that is configured to obtain one or more electronic annotations for association with relevant portions of the selected workflow document. After the electronic annotations are obtained, they are transmitted to the remote server device via the authenticated network connection.

In further embodiments, the remote server device receives the one or more electronic annotations from the authenticated remote client device. The authenticated remote server device can send the received electronic annotations to the similarly-authenticated host client device on which the cross-device transaction-enabled workflow document resides. The authenticated host client device receives the electronic annotations and associates them with relevant portions of the digital workflow document.

Turning now to FIG. 1, a block diagram is provided, illustrating an exemplary system 100 for optimizing cross-device workflow in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. It should be understood that any number of user devices and servers may be employed within the system 100 within the scope of the present disclosure. Each of the servers and client devices shown in FIG. 1 may be implemented via a computing device, such as computing device 900, later described with reference to FIG. 9, for example. The components may communicate with each other via network 130. Each may comprise a single device or multiple devices cooperating in a distributed environment. Additionally, other components not shown may also be included within the system 100.

Enabling a Digital Document for Cross-Device Transactions

Among other components not shown, the system 100 includes, at a high level, a host client device 110 having a document viewer 112, such as ADOBE® ACROBAT® (available from Adobe Systems Inc. of San Jose, Calif.), configured to view and/or manipulate digital documents. In accordance with embodiments described herein, a digital document can be any electronic document, such as a portable document format (PDF) file, an XML or XML-based file, a word processing file, a graphics file, a video file, an audio file, a spreadsheet file, a database, a webpage, an animated graphics file, and any combination of the foregoing including any other file that can be stored and/or accessed using a computing device. The document viewer 112 can include a cloud link client component 114 and a cross-device transaction hosting component 116. In embodiments, the cloud link client component 114 is in communication with a network 120, which may include, without limitation, one or more local area networks (LANs) and/or wide area networks (WANs), such as the Internet.

The cloud link client component 114 can utilize the network 120 to communicate with a remote server device 130, to associate the document viewer 112 with a user account 132 authenticated by the remote server device 130. To this end, the remote server device 130 can facilitate the coordination of data transfer between applications of other computing devices similarly-associated with the user account by operating as a central hub or clearinghouse for data associated with the user account 132. By way of example only, a user account can be a cloud storage account, such as the ADOBE® DOCUMENT CLOUD® (available from Adobe Systems Inc. of San Jose, Calif.), having been enabled to facilitate cross-device transactions in accordance with embodiments described herein.

In some embodiments, the cloud link client component 114 can maintain an authenticated network connection 115 to the cloud link servicing component 134 of the remote server device 130 to facilitate the association of the document viewer 112 with the user account 132, so long as the user remains "signed-in" to the user account 132. In this regard, a host client device 110 having an authenticated network connection 115 to the remote server device 130 is considered an "authenticated" host client device 110.

In further embodiments, the cloud link client component 144 can maintain an authenticated network connection 145 to the cloud link servicing component 134 of the server device 130 to facilitate the association of a document index viewer (not shown) installed on the remote client device 140 with the user account 132, so long as the user remains "signed-in" to the user account 132. In this regard, a remote client device 140 having an authenticated network connection 145 to the remote server device 130 is considered an "authenticated" remote client device 140.

The cross-device transaction hosting component 116 is configured perform various operations, which includes receiving a request (e.g., from a user via a graphical user interface) to enable one or more digital documents for cross-device transactions. In other words, the cross-device transaction hosting component 116 can receive a request, based on a received user input, to enable one or more digital documents to receive electronic annotations 119 from an authenticated remote client device (for example, a mobile computing device) for association with one or more relevant portions of the digital documents. It is contemplated that association of the document viewer 112 with the user account 132, via the cloud link client component 114, is a prerequisite for enabling digital documents for enabling cross-device transactions. In essence, by virtue of the document viewer 112 having an authenticated connection 115 to the user account 132, select digital documents residing on the authenticated host client device 110 can receive cross-device transactions facilitated by embodiments described herein.

In some embodiments, the cross-device transaction hosting component 116 can be further configured to receive the request via a virtual toggle switch or other control button or menu option presented to the user on a user interface of the document viewer 112. The request can be received while the document is provided for display (e.g., currently open and viewable to the user) or while the document is listed as currently residing on the host client device 110 and available to be provided for display thereon. By way of example only, a user viewing the document viewer 112 can enable a particular digital document for cross-device transactions by toggling a virtual switch, selecting a menu item, or utilizing any other means for requesting that the particular document be enabled for cross-device transactions in accordance with embodiments described herein. As was described, it is contemplated that the user is already "signed-in" to their user account via the document viewer 112, such that the host client device 110 is authenticated.

Figure 2A:
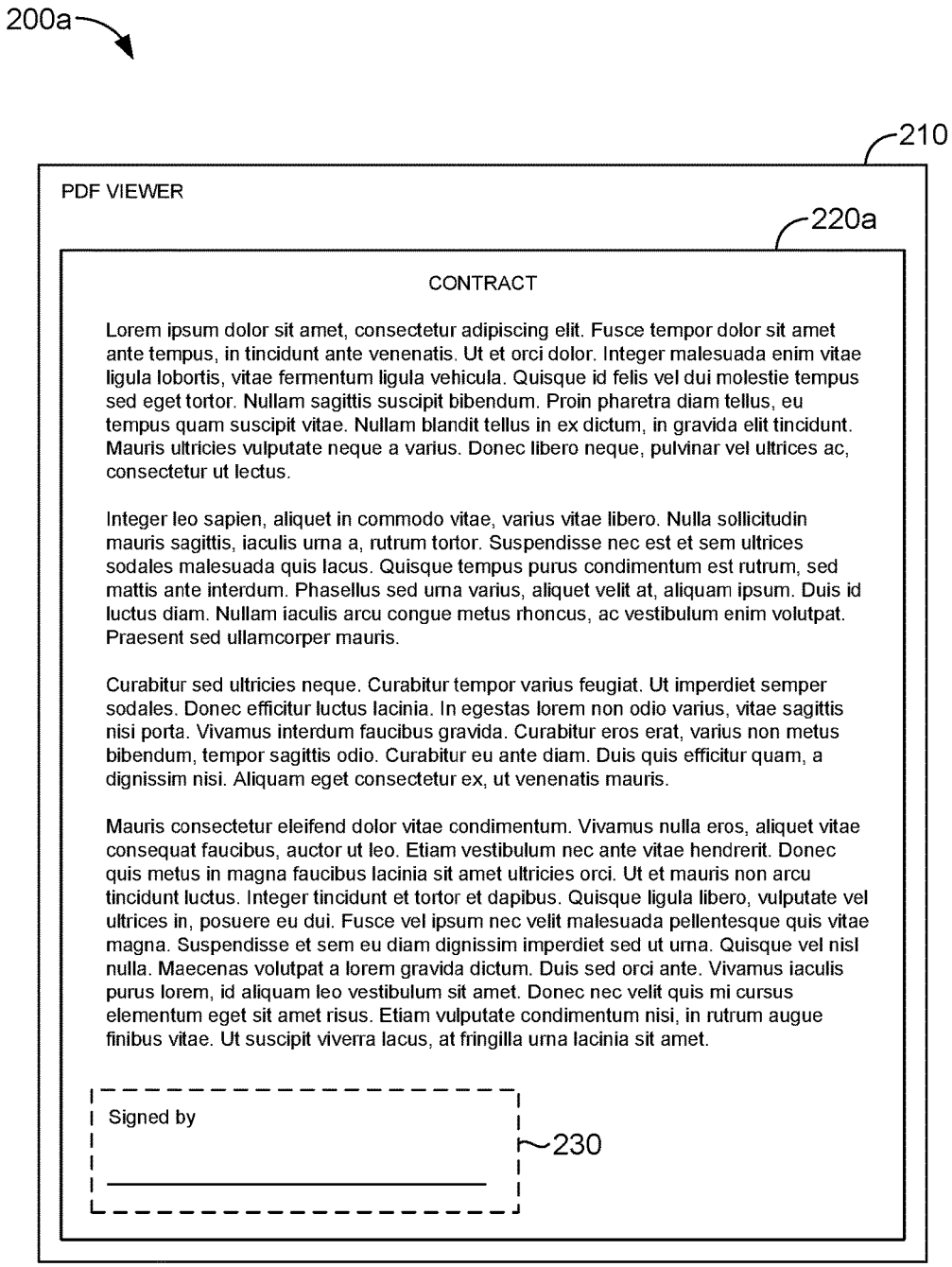
FIGS. 2A-2C are screen displays showing a user interface of a document viewer, in accordance with some implementations of the present disclosure.

In accordance with embodiments described herein, a digital document can include one or more electronically-annotatable objects. With brief reference now to FIG. 2a, an exemplary user interface 200a of a document viewer 210, such as document viewer 112 of FIG. 1, is provided. The document viewer 210 is providing for display a digital document 220a having an electronic signature block 230 included therein. The electronic signature block 230 is an electronically-annotatable object that can receive an electronic signature (i.e., an electronic annotation) from a user of the document viewer 210, or from a user of an application a remote client device employing cross-device transactions (e.g., a document index viewer) on in accordance with embodiments described herein. Among other things, the position and classification (e.g., "signature block") of the electronic signature block can be stored as electronic annotation information within the metadata of the digital document.

The digital document metadata can include, among other things, identifying information that corresponds to the digital document. By way of example, the identifying information in the metadata can include a title, document file name, a document file size, a creation time and/or date of the document, a modification time and/or date of the document, a modification log, a document file path, an author name, a host name, a host network address, a collaborator name, a collaborative group identifier, and a collaborative server network address, among other things. In some further embodiments, the metadata can include references to relevant portions of the cross-device transaction-enabled workflow document configured to receive an electronic annotation. For instance, electronic signature blocks, annotations from the author and/or other collaborative users (e.g., highlights, marks, comments, etc.), and proposed or pending changes in a workflow document, are just some examples of objects that can receive a corresponding electronic annotation.

Figure 2B:
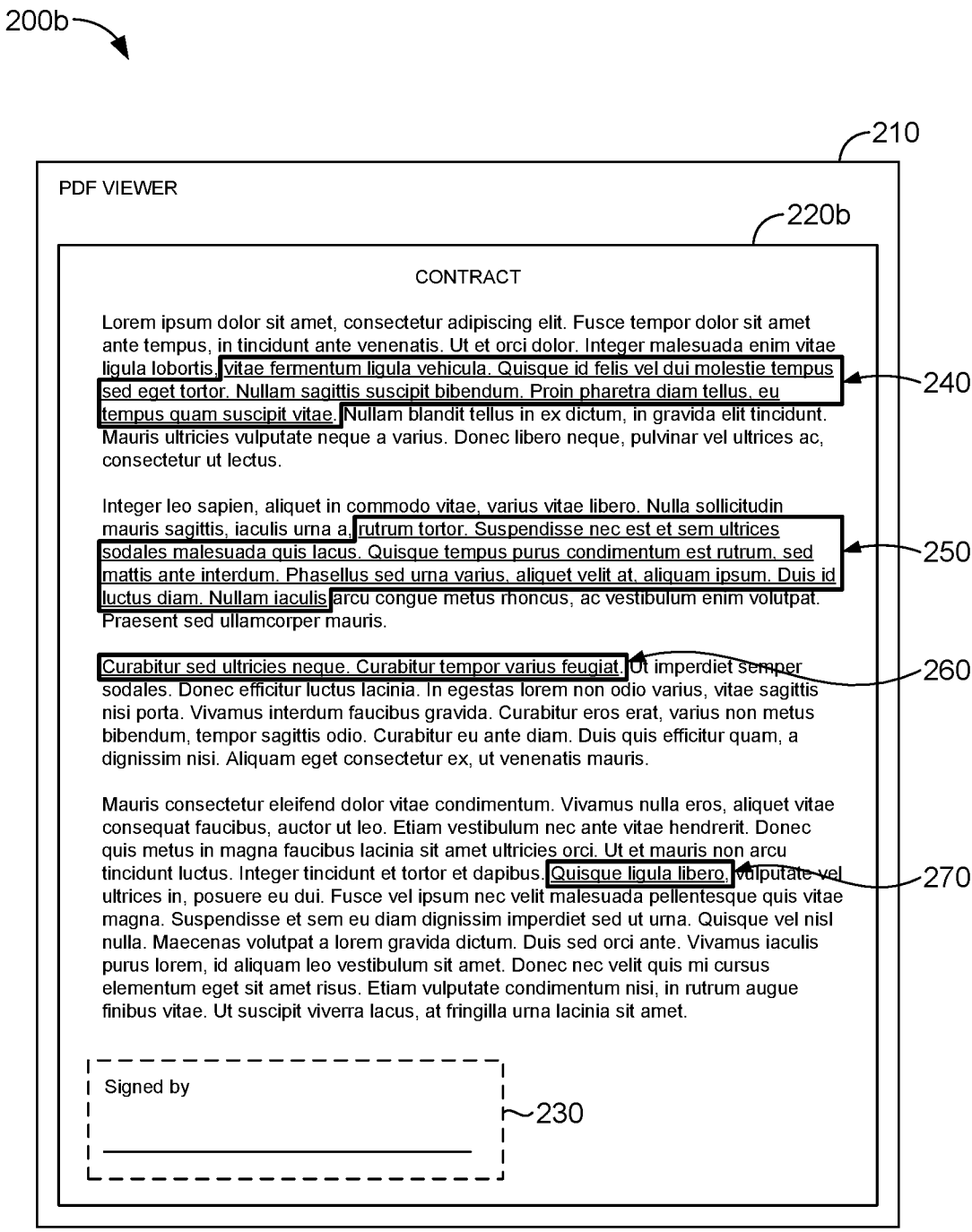

With further reference to FIG. 2b, another exemplary user interface 200b of a document viewer 210 is provided. The document viewer 210 is providing for display a digital document 220b having an electronic ally-annotatable signature block 230 included therein. The digital document 220b also includes a variety of collaborative changes 240, 250, 260, 270 or "edits" made by various collaborative users or viewers of the document. The collaborative changes 240, 250, 260, 270 can include actual changes to the content, or may include highlights, notes, questions, or any other electronic annotations that are not part of the original underlying digital document. Electronic annotation information corresponding to each of the collaborative changes 240, 250, 260, 270 can be tracked in the metadata of the digital document. For instance, the position, classification (e.g., "collaborative change"), and/or editing author associated with each of the collaborative changes 240, 250, 260, 270 can be stored within the metadata of the digital document.

It is within the purview of the present disclosure that any portion of a digital document can be automatically or manually designated as being electronically-annotatable. For instance, digital documents can be designed to include form fields, check boxes, radio buttons, signature blocks, and the like, and can each be automatically designated as being portions of a digital document that can receive electronic annotations. In such instances, corresponding electronic annotation information is automatically included within the metadata of the digital document. In other instances, a user can choose to manually annotate a digital document with highlights, digital notes, digital writings, and the like, and can further manually designate form fields, checkboxes, radio buttons, and electronic signature blocks, among other things, to generate electronic annotation information for inclusion in the metadata of a digital document.

In accordance with embodiments described herein, the metadata 118 of a digital document, particularly a cross-device transaction-enabled digital document, can include, among other things, the digital document file name, file size, modification time and date, and/or electronic annotation information corresponding to the electronically-annotatable objects included in the digital document. In embodiments, only the metadata 118 of a digital document, and not a copy of the digital document, is transmitted across the network in response to the digital document being enabled for cross-device transactions.

Looking back now to FIG. 1, in embodiments, based on the digital document being enabled for cross-device transactions, the cross-device transaction hosting component 116 can employ the authenticated network connection 115 to transmit metadata 118, or at least a portion of the metadata 118, associated with the cross-device transaction-enabled digital document from the document viewer 112 to the cross-device transaction servicing component 36.

As will be described, the cross-device transaction hosting component 116 can also employ the authenticated network connection 115 to receive one or more electronic annotations 119 relayed from a remote client device 140. In other words, the cross-device transaction hosting component 116 can receive electronic annotations 119 from a remote client device 140, via a relaying of the electronic annotations 119 by the cross-device transaction servicing component 136, for association with the cross-device transaction-enabled digital document.

Enabling a Digital Document for Cross-Device Transactions

In embodiments, the server device 130 can establish authenticated network connections 115, 145 with one or more host client devices, such as host client device 110, and/or one or more remote client devices, such as remote client device 140. More specifically, the server device 130 can include a cloud link servicing component 134 that can receive a connection request from a client device 110, 140 utilizing a cloud link client component 114, 144, establish a network connection with the client devices 110, 140 utilizing the cloud link servicing component 134, and further authenticate the client device 110, 140 based on verified account credentials to establish an authenticated network connection 115, 145 therewith. For purposes of this description, while the illustrations show only one user account 132, it is contemplated that the server device 130 can authenticate credentials and manage memory storage locations for any number of user accounts, as one of ordinary skill in the art can appreciate.

In embodiments, the server device 130 includes a cross-device transaction servicing component 136 that is configured to manage the transfer of metadata 118 or electronic annotations 119 between similarly-authenticated client devices, such as authenticated host client device 110 and authenticated remote client device 140. In some embodiments, the server device 130 can receive a request for and establish an authenticated network connection 115 from a host client device 110. In embodiments, the server device 130 can receive, via the authenticated network connection 115, metadata 118 for a cross-device transaction-enabled digital document residing on the authenticated host client device 110. Upon receiving the metadata 118 from the authenticated host client device 110, the server device 130 can store the received metadata 118 into a memory storage location (not shown) associated with the user account 132 on which the authenticated network connection 115 is based.

In further embodiments, the server device 130 can receive a request for and establish an authenticated network connection 145 with a remote client device 140. Based on establishing the authenticated network connection 145, the server device 130 can provide the authenticated remote client device 140 with, among other things, the stored metadata 118 associated with the user account 132 on which the authenticated network connection 145 is based.

In some embodiments, the authenticated remote client device 140 can include a cross-device transaction client component 146 that can employ the authenticated network connection 145 established between the cloud link client component 144 and the user account 132 to receive, among other things, the metadata 118, or at least a portion thereof, to provide for display a graphical user interface configured to obtain electronic annotations for association with a cross-device transaction-enabled digital document residing on the authenticated host client device 110.

In further embodiments, the cross-device transaction hosting component 146 can also employ the authenticated network connection 145 to send one or more electronic annotations 119 obtained by the authenticated remote client device 140 to the cross-device transaction servicing component 136 of the server device 130. In other words, the cross-device transaction hosting component 146 can send electronic annotations 119 obtained by the authenticated remote client device 140 to a cross-device transaction-enabled digital document residing on the authenticated host client device 110, via a relay of the electronic annotations 119 by the cross-device transaction servicing component 136.

In some implementations, the authenticated remote client device 140 can receive the metadata 118 and, employing a document index viewer 142, provide for display thereon a list of cross-device transaction-enabled digital document(s) residing on the similarly-authenticated host client device 110. To this end, a user can select a particular digital document from the list on which he/she desires to perform an available transaction. In response to the selection of a particular transaction to be performed on the selected cross-device transaction-enabled digital document, the authenticated remote client device 140 can obtain and send an electronic annotation to the server device 130.

In some embodiments, the server device 130 can relay electronic annotations obtained from the authenticated remote client device to a similarly-authenticated host client device for association with a cross-device transaction-enabled digital document residing thereon. In other words, for a cross-device transaction-enabled digital document residing on an authenticated host client device, such as host client device 110, the cross-device transaction servicing component 136 can obtain one or more electronic annotations from a similarly-authenticated remote client device 140, and send the obtained electronic annotations to the authenticated host client device 110 for association with relevant portions of the cross-device transaction-enabled digital document.

Exchanging the Cross-Device Transaction

Figure 3:
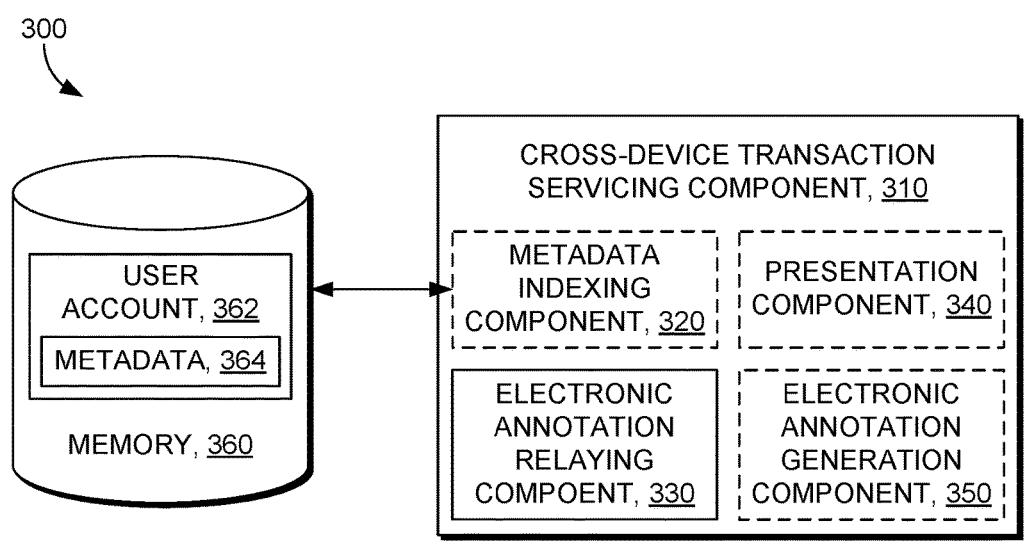
FIG. 3 is a block diagram illustrating an exemplary configuration of a cross-device transaction servicing component, in accordance with some implementations of the present disclosure.

Looking now to FIG. 3, a block diagram 300 illustrating an exemplary configuration of a cross-device transaction servicing component 310, such as cross-device transaction servicing component 136 of FIG. 1, is provided. In some embodiments, the cross-device transaction servicing component 310 can include a metadata indexing component 320, an electronic annotation relaying component 330, a presentation component 340, and an electronic annotation generation component 350.

The aforementioned components may be included in embodiments where user interfaces for obtaining transactions (e.g., electronic annotations) from a user are provided to the remote client device by a server device, such as server device 130 of FIG. 1. In some embodiments, the user interfaces are provided to an authenticated remote client device, such as remote client device 140 of FIG. 1, for display thereon. In other words, if the server device 130 utilizes a web or application service to provide a web-based or dynamically-generated user interface to an authenticated remote client device for performing cross-device transactions, then at least the presentation component 340 and electronic annotation generation component 350 are necessary components of the server device, in accordance with some embodiments.

In other embodiments, the remote client device may have a document index viewer, such as document index viewer 142 of FIG. 1, configured to provide the same or similar operations and functionalities as any one or more of the metadata indexing component 320, the presentation component 340, and/or the electronic annotation generation component 350, on the client-side. In various embodiments, the remote client device must, at a minimum, receive the metadata (or a list comprising the metadata) corresponding to the user account through which the remote client device is authenticated, provide for display a list comprising the metadata, and obtain one or more electronic annotations for communication back to the server device in response to a selected piece of metadata. In some embodiments, where the server device provides the authenticated remote client device with a web-based or dynamically-generated user interface for performing cross-device transactions, the document index viewer 142 of FIG. 1 can be a web-based application viewable in a web browser, or any other dynamically-provided application operable to perform cross-device transactions in accordance with embodiments described herein.

In some embodiments, the metadata indexing component 320 can retrieve and/or obtain from a portion of memory 360 associated with a user account 362, the metadata 364 received from the host client device and stored therein. The metadata indexing component 320 can generate from the obtained metadata, for a remote client device authenticated with the user account 362, a list that includes each piece of metadata, or at least portions thereof, that is associated with the cross-device transaction-enabled digital document(s) and stored in the portion of memory 360 associated with the user account 362. The list can include document file names, sizes, modification times, etc., as indicated in the metadata 364. In some embodiments, the list may be included in a listing of "Recent" files associated with and residing on the authenticated host client device 110. In embodiments, the list generated by the metadata indexing component 320 can be provided for display on the authenticated remote client device 140. For instance, the list can be provided on a document index viewer 142 provided for display on the remote client device 140.

In some embodiments, the presentation component 340 can generate information to provide, or in other embodiments populate, a user interface that includes the generated "list" of cross-device transaction-enabled digital document(s). In some embodiments, the presentation component 340 can be configured to generate dynamic webpage content that is generated based at least in part on the "list" of cross-device transaction-enabled digital document(s) including the obtained metadata 364. In such embodiments, the server device 130 may comprise a web server, such as Apache®, IIS®, Nginx®, GWS®, or the like, and can be further configured to communicate modules and/or services over the network to an authenticated remote client device (for instance, remote client device 140 of FIG. 1) for facilitating the receipt of cross-device transactions therefrom. In other embodiments, the presentation component can comprise dynamic programming code (e.g., Java®, JavaScript®, Ruby®, ActiveX®, Flash®, ActionScript®, HTML5, etc.) that can generate a graphical user interface based at least in part on the generated "list" or the obtained metadata. In other embodiments, the presentation component 340 can simply provide and receive transmissions related to the cross-device transactions as described herein.

As was described, varying configurations for facilitating the receipt of cross-device transactions from an authenticated remote client device, such as remote client device 140, is considered within the purview of the present disclosure. For instance, the remote client device may include a document index viewer that provides the modules and/or services necessary to provide for display various interfaces and receive various inputs that are in accordance with embodiments described herein.

Figure 4A:
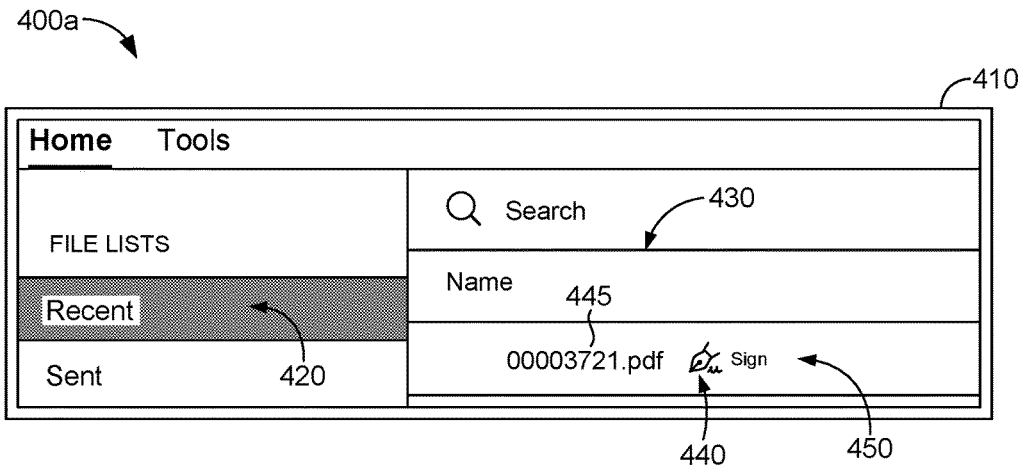
FIGS. 4A-4B are screen displays showing a user interface of a document index viewer, in accordance with some implementations of the present disclosure.

Looking now to FIG. 4a, an exemplary user interface 400a of a document index viewer is provided, illustrating a first view 410 that comprises, among other things, a recent files option 420 to display a list 430 of cross-device transaction-enabled digital document(s) associated with a user account. The first view 410 shows that the recent files option 420 is selected, and includes a list 430 of cross-device transaction-enabled digital document(s) 440 for the user account. As was described, only the metadata or a portion thereof is used to generate the list 430. In the provided illustration, only the document file name 445 in the metadata was utilized to generate the list 430.

In some embodiments, each listed piece of metadata or portion thereof may be accompanied by one or more action icons. An action icon can correspond to an available action (e.g., electronic signature, predefined comment, custom comment, etc.) to perform for one or more relevant portions of the digital document. As was previously described, the digital document metadata can include classifications of different electronically-annotatable objects included in the digital document. For instance, a classification of one electronically-annotatable object may indicate a "collaborative change" (e.g., highlight, edit, comment, annotation, etc.), a "signature block" (i.e. for electronic signature), a "form block" (i.e., space for form content), or other available classification. To this end, for each classification that is identified in the metadata for a particular digital document in the list 430, a corresponding action icon can be included to identify the action and also to initialize, upon receiving a selection thereof, a widget for obtaining electronic annotations for the electronically-annotatable object(s). For example, if one of the electronically-annotatable objects in a listed document is a signature block, then a "Sign" icon 450 can be configured alongside or near the listed document.

In another example, if multiple electronically-annotatable objects in the listed document are, for instance, collaborative changes (e.g., highlights or notes on the face of the document), then a single "Review" icon (not shown) or an equivalent label can be configured alongside or near the listed document. The selection of the "Review" icon, by receiving a touch input corresponding thereto, can also initialize an electronic annotation selection widget and/or an electronic annotation generation widget on the remote client device, as will now be described.

In embodiments, the electronic annotation generation component 350 can initialize, for display on the remote client device, an electronic annotation selection widget or an electronic annotation generation widget in response to receiving a selection (e.g., a corresponding touch input) of an action icon, such as "Sign" icon 450 or "Review" icon, as will now be described.

Figure 4B:
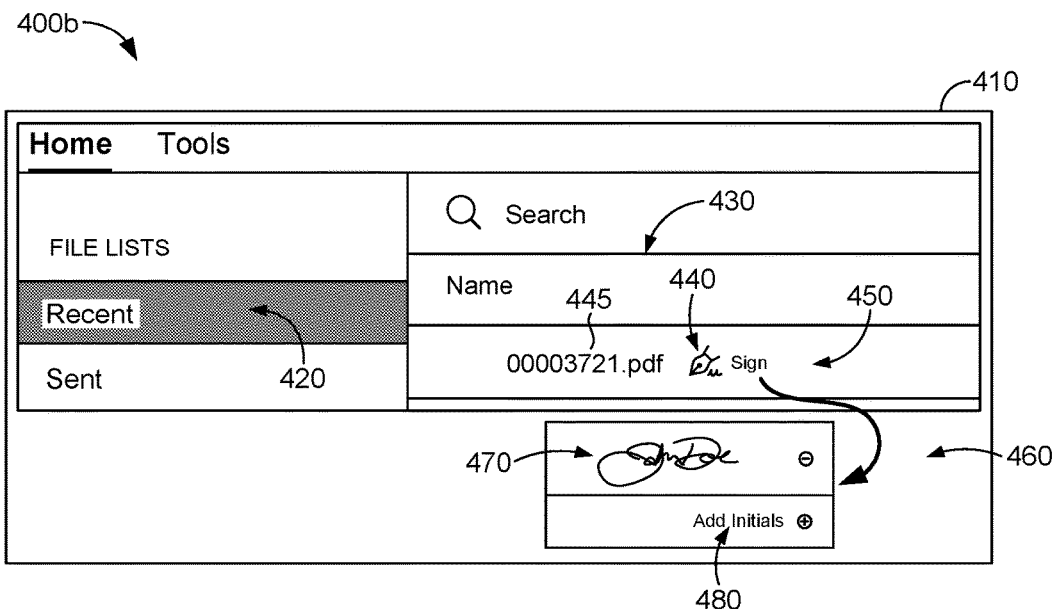

With reference now to FIG. 4b, another exemplary user interface 400b of a document index viewer is provided, illustrating a first view 410 that comprises, among other things, a recent files option 420 to display the list 430 of cross-device transaction-enabled digital document(s) associated with the user account. As was described herein above with reference to FIG. 4a, the first view 410 shows that the recent files option 420 is selected, and includes a list 430 of cross-device transaction-enabled digital document(s) 440 for the user account. In the provided illustration, the first view 410 illustrates an electronic annotation selection widget 460 that is provided for display in response to a received selection of an action icon 450.

In some embodiments, a received selection of an action icon, such as action icon 450, can generate and provide for display an electronic annotation selection widget, such as electronic annotation selection widget 460. The electronic annotation selection widget 460 is provided and/or generated for display to provide the user with a quick select menu. In some embodiments, the quick select menu can comprise previously-obtained electronic annotations (as is illustrated by saved electronic signature 470) and/or an option to add a new customized electronic annotation (as is illustrated by the "add" option 480).

In further embodiments, the quick select menu displayed in response to the selected action icon can comprise predefined electronic annotations that correspond to a classification of an electronically annotatable object. By way of example only, if the action icon is a "Review" icon corresponding to a collaborative change made in the document, the quick select menu may provide a variety of predefined stamps. A predefined stamp can include, among other things, common words or phrases typically used in a document review workflow. For example, the words or phrases in a stamp can include various terms, such as "APPROVED", "DISAPPROVED", "CONFIRMED", "DELETE", "REVIEW", etc. The stamps can be designed using large type fonts, bold colors, and/or other noticeable characteristics, by way of example only. As was described above, in some embodiments, the quick select menu can further include an add option (as is illustrated by the "add" option 480) configured to initialize a process for obtaining a new customized stamp.

In response to a received selection corresponding to the "add" option, the presentation component 340 can send the selection event to the electronic annotation generation component 350 to initialize an electronic annotation generation widget. In other words, the electronic annotation generation component 350 can initialize for display, based on a received input (e.g., corresponding to the "add" option 480), an electronic annotation generation widget that can present various interfaces for obtaining electronic annotations from a user of the remote client device. In embodiments, the annotation generation widget comprises an interactive user interface so that a user of an authenticated remote client device can submit electronic annotations to relevant portions of the cross-device transaction-enabled digital document residing on the host client device. In embodiments, the electronic annotations can be handwritten (i.e., via touch-based gestures), typed, or selected from one or more predefined or customized stamps.

Figure 5A:
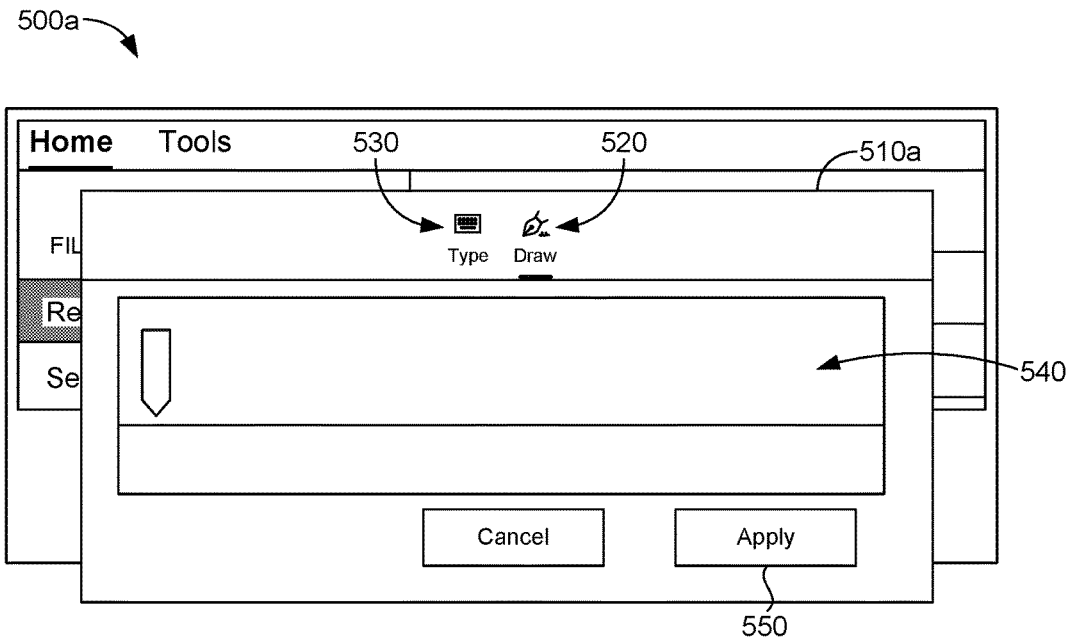
FIGS. 5A-5B are screen displays showing another user interface of a document index viewer, in accordance with some implementations of the present disclosure.

Looking now to FIG. 5a, another exemplary user interface 500a of a document index viewer is illustrated. The exemplary user interface 500a includes an exemplary electronic annotation generation widget 510a for obtaining an electronic annotation classified as an electronic signature, in accordance with some embodiments described herein. In embodiments, the annotation generation widget 510a for obtaining the electronic signature can include a draw option and/or a type option, as indicated by draw icon 520 and type icon 530. In some embodiments, the electronic signature display area 540 can be switched to facilitate a touch-based input method or a keyboard-based input method in response to a selection of a respective icon 520, 530. Various configurations for enabling one or more input methods are also considered within the purview of the present disclosure.

When a user of an authenticated remote client device, such as remote client device 140 of FIG. 1, is presented with the exemplary annotation generation widget 510a with a touch-based input method enabled, the remote client device can receive one or more touch-based gestures on the electronic signature display area 540 to generate a customized electronic annotation (e.g., a biometric signature) for association with a corresponding signature block of a cross-device transaction-enabled digital document(s). Similarly, in another embodiment, when a keyboard-based input method is enabled, the remote client device can receive one or more keyboard inputs to display a virtual electronic signature on the electronic signature display area 540, to generate a customized electronic annotation for association with a corresponding signature block of a cross-device transaction-enabled digital document(s).

Figure 5B:
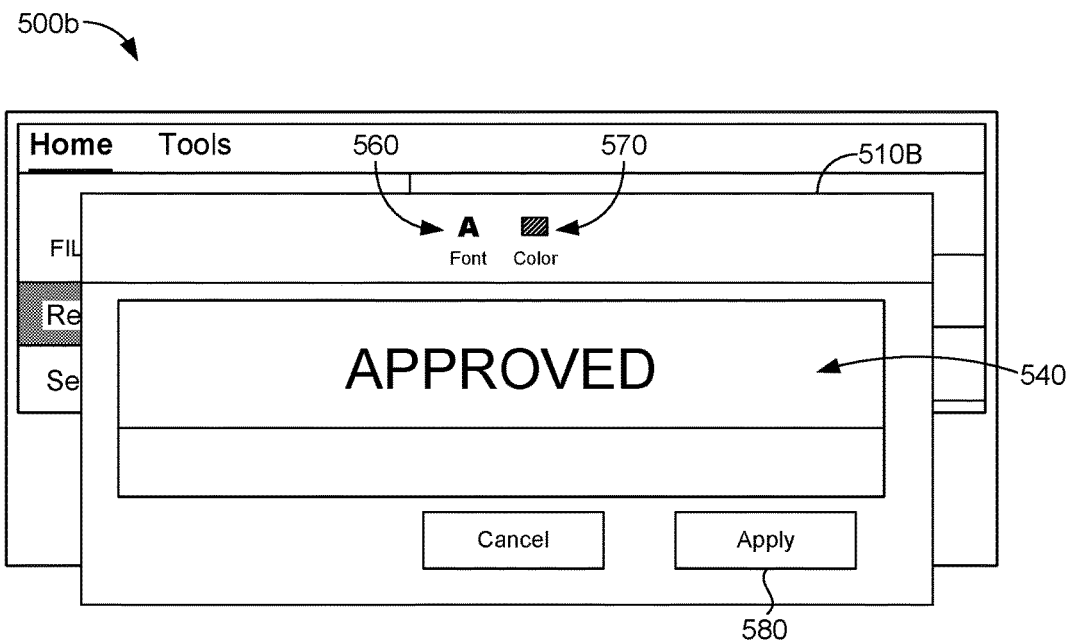

Looking now to FIG. 5b, another exemplary user interface 500b of a document index viewer is illustrated. The exemplary user interface 500b includes an exemplary electronic annotation generation widget 510b for obtaining an electronic annotation classified as a collaborative change or form block, among other things, in accordance with some embodiments described herein. In embodiments, the annotation generation widget 510b for obtaining the corresponding electronic annotation can include various options to adjust, among other things, the color and font of the electronic annotation, as indicated by font icon 560 and color icon 570.

When a user of an authenticated remote client device, such as remote client device 140 of FIG. 1, is presented with the exemplary annotation generation widget 510b, the remote client device can receive one or more keyboard inputs to display a customized comment in the electronic annotation display area 540 to generate a customized electronic annotation for association with a corresponding annotatable object of a cross-device transaction-enabled digital document(s). It is contemplated that electronically annotatable objects that are not classified as electronic signatures, as was referenced in FIG. 5a, can also be configured to receive customized electronic annotation based on touch-based gestures (i.e., handwritten) in the same way as electronic signatures.

In embodiments, the electronic annotation generation component 350 of FIG. 3 can obtain from a user, via a touchscreen or other input method of an authenticated remote client device, electronic annotations for association with relevant portions of a cross-device transaction-enabled digital document residing on a host client device. In response to a received selection of a saved electronic annotation, or in response to an acceptance of a newly-customized electronic annotation, an authenticated remote client device, such as remote client device 140 of FIG. 1, can transmit the obtained electronic annotation to the server device via an authenticated network connection, such as authenticated network connection 145 of FIG. 1. 145. In embodiments, the obtained electronic annotation is sent to the server device with at least a portion of the metadata that identifies the relevant portion of the cross-device transaction-enabled digital document for which the electronic annotation is intended for. For instance, the metadata sent with the obtained electronic annotation may include a host client name or identifier, document name or identifier, electronically annotatable object position, electronically annotatable object classification, electronically annotatable object identifier, and/or any other identifying information that can enable a document viewer of the host client device to identify which host, digital document, and portion of the digital document is to be associated with the electronic annotation.

As was described, a server device, such as server device 130 of FIG. 1, can receive one or more electronic annotations from an authenticated remote client device, such as remote client device 140. In some embodiments, the obtained electronic annotations 119 may be accompanied with corresponding metadata that identifies the portion of the cross-device transaction-enabled digital document for which the electronic annotation 119 is intended. The electronic annotation relaying component 330 of cross-device transaction servicing component 310 can utilize a cloud link servicing component, such as cloud link servicing component 134 of FIG. 1, to identify all client devices 110, 140 associated with and authenticated via the user account 132. In some embodiments, based on the metadata included in the obtained electronic annotation 119, the electronic annotation relaying component 330 can also determine which one of the client devices 110, 140 is the host client device 110 storing the cross-device transaction-enabled digital document for which the electronic annotation 119 is intended. To this end, the server device 130 can transmit, to the appropriate host client device 110, the obtained electronic annotation 119 for association with a relevant portion of the cross-device transaction-enabled digital document.

In embodiments, responsive to receiving the electronic annotation(s) 119 from the server device 130 of FIG. 1, the host client device 110 is configured to associate the electronic annotation(s) 119 with the cross-device transaction-enabled digital document residing thereon. As was described, in some embodiments, the received electronic annotation(s) 119 can include metadata (e.g., the electronic annotation information) to facilitate the coordination of assigning each electronic annotation with a particular portion of a corresponding digital document. In some embodiments, the document viewer 112 can be configured to automatically determine where each received electronic annotation 119 is to be positioned and associated with the cross-device transaction-enabled digital document based on the metadata included with the electronic annotation(s) 119 received from the server device 130.

Figure 2C:
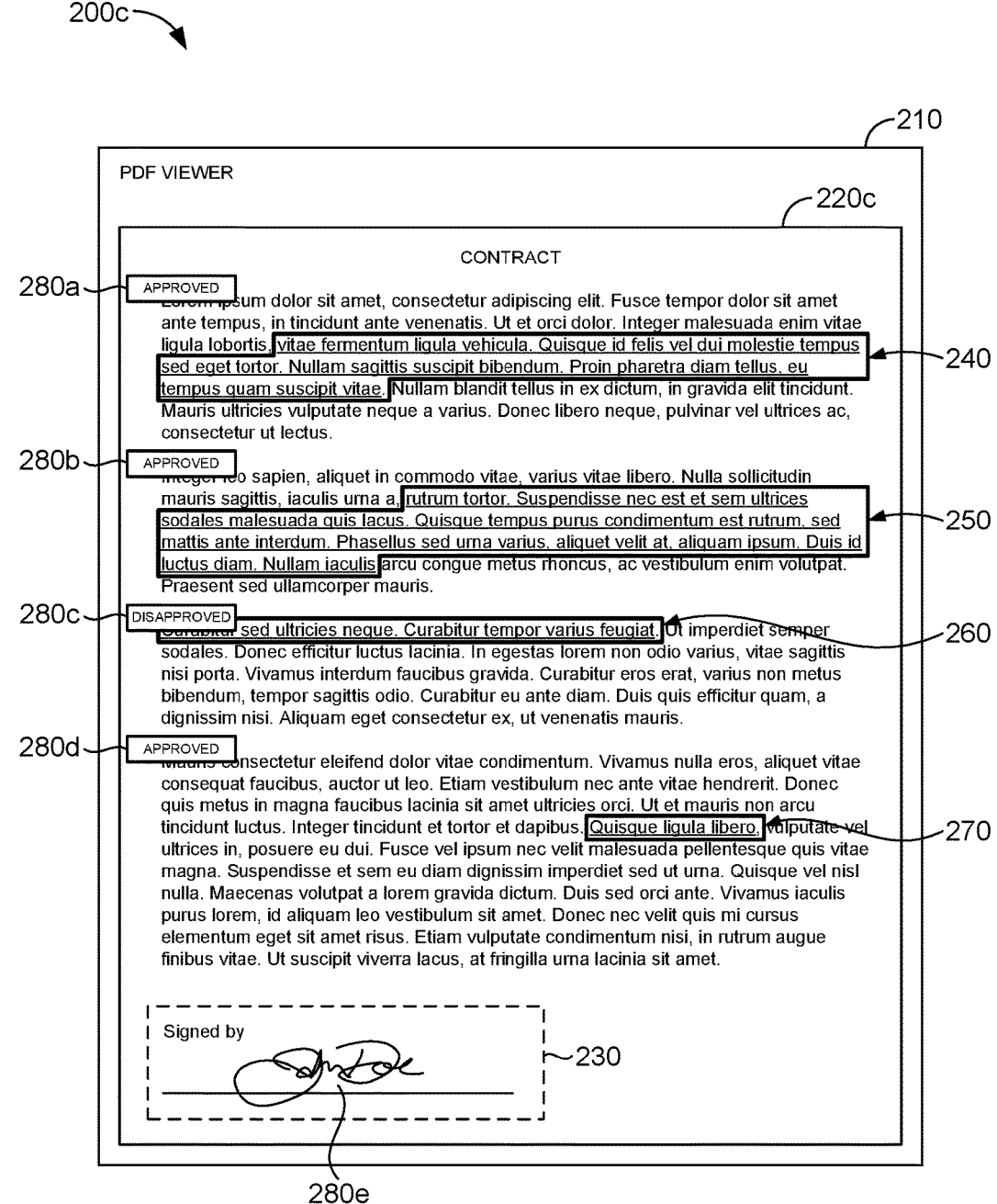

With brief reference back to FIG. 2c, an exemplary user interface 200c of a document viewer 210 of a host client device, such as host client device 110 of FIG. 1, is provided. As was described with reference to FIG. 2b, the document viewer 210 is provided for displaying a digital document 220c having an electronically-annotatable signature block 230 and a variety of collaborative changes 240, 250, 260, 270 or "edits" made by various collaborative users or viewers of the document. As was also described, electronic annotation information corresponding to each of the collaborative changes 240, 250, 260, 270 was tracked in the metadata of the digital document. For instance, the position, classification (e.g., "collaborative change"), and/or editing author associated with each of the collaborative changes 240, 250, 260, 270 was stored within the metadata of the digital document. To this end, upon receiving the electronic annotations from the server device as part of the cross-device transaction workflow, the document viewer 210 of the host client device automatically associates each received electronic annotation 280a, 280b, 280c, 280d, 280e with relevant portions of the digital document 220c, by superimposing the electronic annotation 280a, 280b, 280c, 280d, 280e to the relevant portions thereof, based on the metadata and electronic annotation information included with the received electronic annotation(s).

Method for Enabling Cross-Device Transactions for Local Digital Documents

Figure 6:
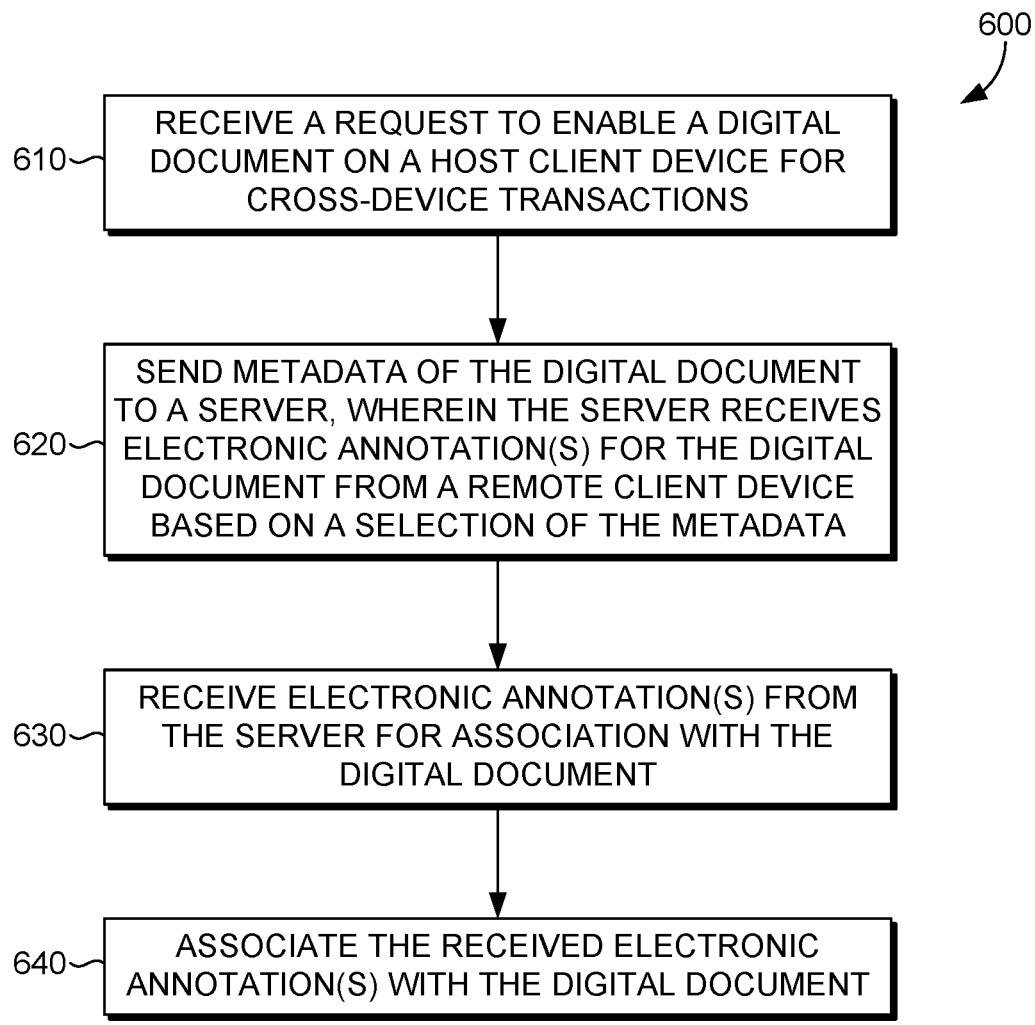
FIG. 6 is a flow diagram showing a method for optimizing cross-device workflows by enabling cross-device transactions for local digital documents, in accordance with implementations of the present disclosure.

Having described various aspects of the present disclosure, exemplary methods are described below for obtaining biometric signatures for electronically signing digital documents. Referring to FIG. 6 in light of FIGS. 1-5, FIG. 6 is a flow diagram showing a method 600 for optimizing cross-device workflows by enabling cross-device transactions for local digital documents. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 610, a request to enable a digital document residing on a host client device, for electronic annotation by a remote client device while the digital document is residing on a host client device, is received by the host client device. In other words, a document viewer, such as document viewer 112 of FIG. 1, can receive a request to enable a particular document to be remotely-annotated by a remote client device, such as a mobile phone. By way of example only, the digital document can be a PDF file having one or more electronically annotatable objects provided thereon, and can be presented in a document viewer such as Adobe® Acrobat®.

At block 620, a piece of metadata associated with the digital document is sent from the host client device to a remote server device, such as remote server device 130 of FIG. 1. The remote server device can be configured to provide, to an authenticated remote client device such as remote client device 140 of FIG. 1, all pieces of metadata received from the host client device. In some instances, the remote server device can allocate the pieces of metadata in particular memory storage locations based on a user account with which the host client device and remote server devices, or components thereof, are associated. The remote server device can also receive, from the remote client device, an electronic annotation for association with the digital document residing on the host client device. In some embodiments, as described herein, the pieces of metadata can indicate which portions of the digital document are configured to receive electronic annotations, and can be utilized to coordinate the requesting of and placement of electronic annotations.

At block 630, the host client device receives at least one electronic annotation from the remote server device. The at least one electronic annotation received from the remote server device was obtained, by the remote server device, from the remote client device, in accordance with embodiments described herein.

At block 640, the host client device associates the received at least one electronic annotation with the digital document residing thereon. As is described herein, pieces of metadata included with the obtained electronic annotations may indicate which portion of the digital document a particular electronic annotation is intended for. Accordingly, the host client device can utilize the metadata to associate each received electronic annotation to a relevant or corresponding portion of the digital document by, among other things, superimposing the electronic annotation to the relevant or corresponding portion of the digital document.

Method for Providing Cross-Device Transactions to Remote Digital Documents

Figure 7:
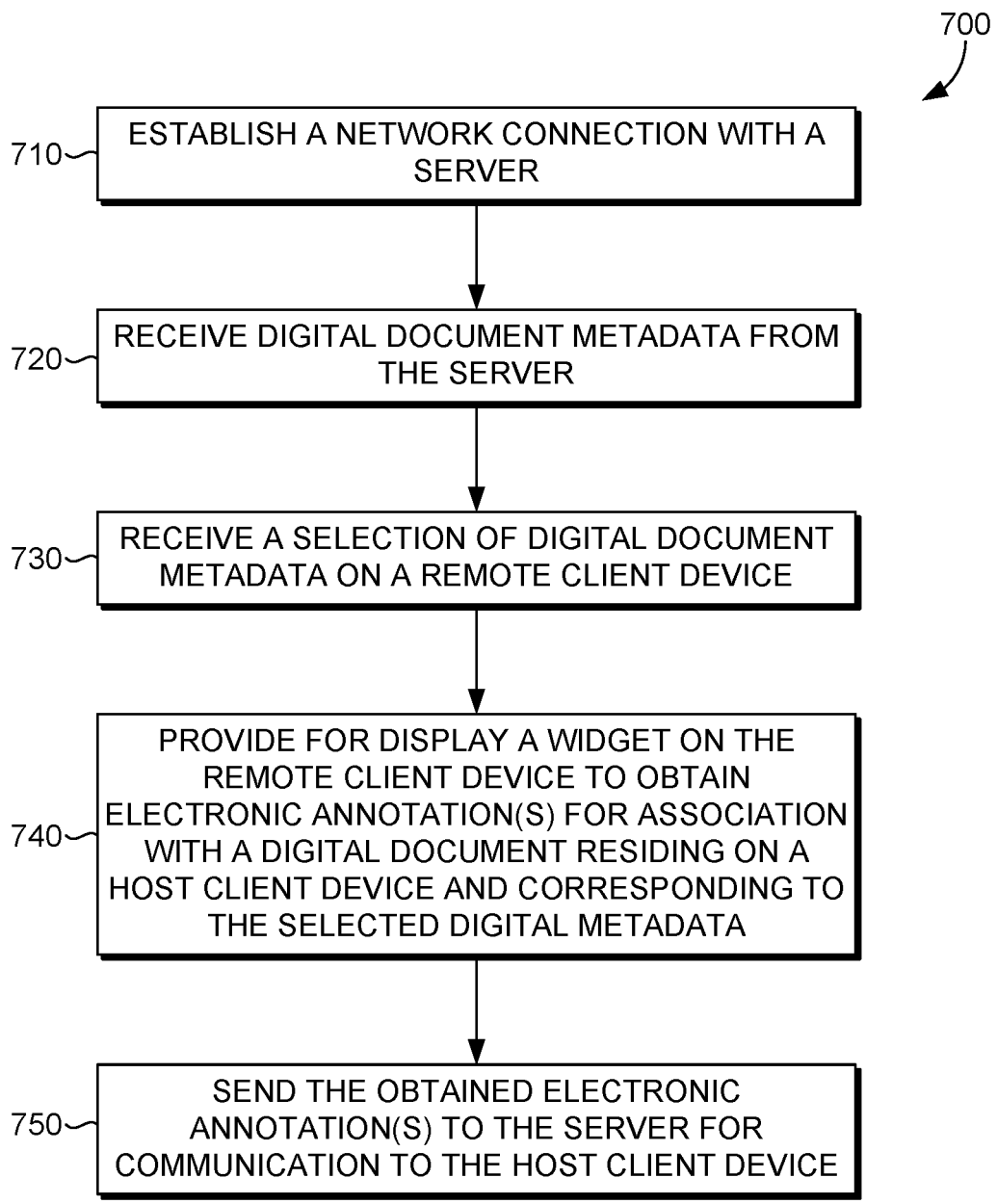
FIG. 7 is a flow diagram showing a method for optimizing cross-device workflows by providing cross-device transactions to remote digital documents, in accordance with implementations of the present disclosure.

Referring to FIG. 7 in light of FIGS. 1-5, FIG. 7 is a flow diagram showing a method 700 for optimizing cross-device workflows by providing cross-device transactions to remote digital documents. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 710, an authenticated network connection is established from a remote client device, such as a tablet or mobile phone, to a remote server device. The network connection can be authenticated by the remote server device based on user account credentials included in a request to the remote server device, from the remote client device, to establish the authenticated network connection.

At block 720, at least one piece of digital document metadata is received from the remote server device via the authenticated network connection. Each piece of digital document metadata is associated with a corresponding digital document that resides on a host client device located remotely from the remote client device. The digital document residing on the host client device is enabled to be electronically annotated by the host client device, in accordance with embodiments described herein.

At block 730, a selection that corresponds to a particular piece of metadata is received on the remote client device. In other words, the remote client device can provide for display one or more pieces of metadata that each correspond to a digital document residing on the host client device. Each piece of metadata can represent a corresponding digital document, and can also receive a corresponding input from a user of the remote client device to select the corresponding digital document. In some embodiments, each piece of metadata can also be accompanied by one or more action icons that each correspond to available actions that can be remotely-performed on the digital document residing on the host client device. In this regard, in further embodiments, the selection can correspond to a particular action icon adjacent to a particular piece of metadata, such that a particular action can be remotely-performed for a particular digital document.

At block 740, a widget is provided for display on the remote client device. The widget can be provided for display in response to the received selection of block 730. The widget can be an interactive user interface that is configured to obtain one or more electronic annotations for association with a particular digital document residing on the host client device.

At block 750, the obtained at least one electronic annotation is sent to the remote server device, from the remote client device, via the authenticated network connection. The remote server device is configured to communicate the at least one electronic annotation to the host client device on which the particular digital document is residing, so that it can be associated with the digital document accordingly (e.g. superimposed onto a corresponding portion of the digital document).

Method for Centrally Managing Cross-Device Transactions

Figure 8:
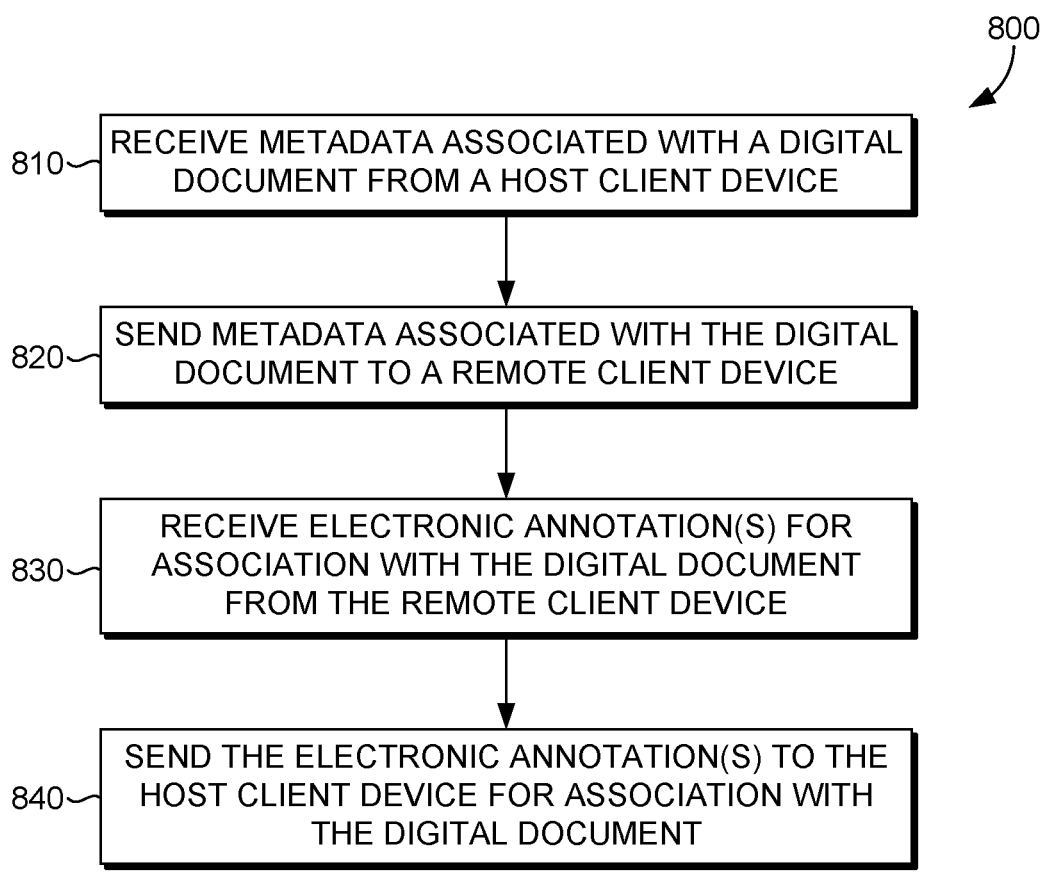
FIG. 8 is a flow diagram showing a method for optimizing cross-device workflows by centrally managing cross-device transactions, in accordance with implementations of the present disclosure.

Referring to FIG. 8 in light of FIGS. 1-5, FIG. 8 is a flow diagram showing a method 800 for optimizing cross-device workflows by centrally managing cross-device transactions. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, a piece of metadata is received by a server device, such as server device 130 of FIG. 1, from a host client device. The piece of metadata is associated with a digital document that is residing on the host client device. In embodiments, the piece of metadata is sent to the server device from the host client device in response to a request to enable the digital document for cross-device transactions, in accordance with embodiments described herein. In some embodiments, the host client device is authenticated by the server device, based on user account credentials utilized when establishing a network connection to the server device. In some embodiments, the received piece of metadata is stored in memory and associated with the user account through which the host client device is authenticated. To this end, the server device can manage the access-restricted flow of data between multiple authenticated devices connected thereto.

At block 820, at least the piece of metadata associated with the digital document is sent to a remote client device, such as remote client device 140 of FIG. 1. In embodiments, the remote client device is similarly-authenticated by the server device, such that the host client device and the remote client device are commonly associated with the same user account.

At block 830, the server device receives, from the remote client device, at least one electronic annotation for association with the digital document residing on the host client device. The remote client device is configured to send, to the server device, the at least one electronic annotation based at least in part on a received selection. The selection can correspond to a piece of metadata displayed on the remote client device, in accordance with embodiments described herein.

At block 840, the server device sends, to the host client device, the at least one electronic annotation for association with the digital document residing thereon. In other words, the server device has relayed (for instance, utilizing electronic annotation relaying component 330 of FIG. 3) the electronic annotations intended for a particular digital document to the host client device on which the particular digital document resides. The host client device can, upon receiving the electronic annotations, associate the electronic annotations to the particular digital document accordingly (e.g., superimposing the electronic annotation onto a corresponding portion of the digital document).

Figure 9:
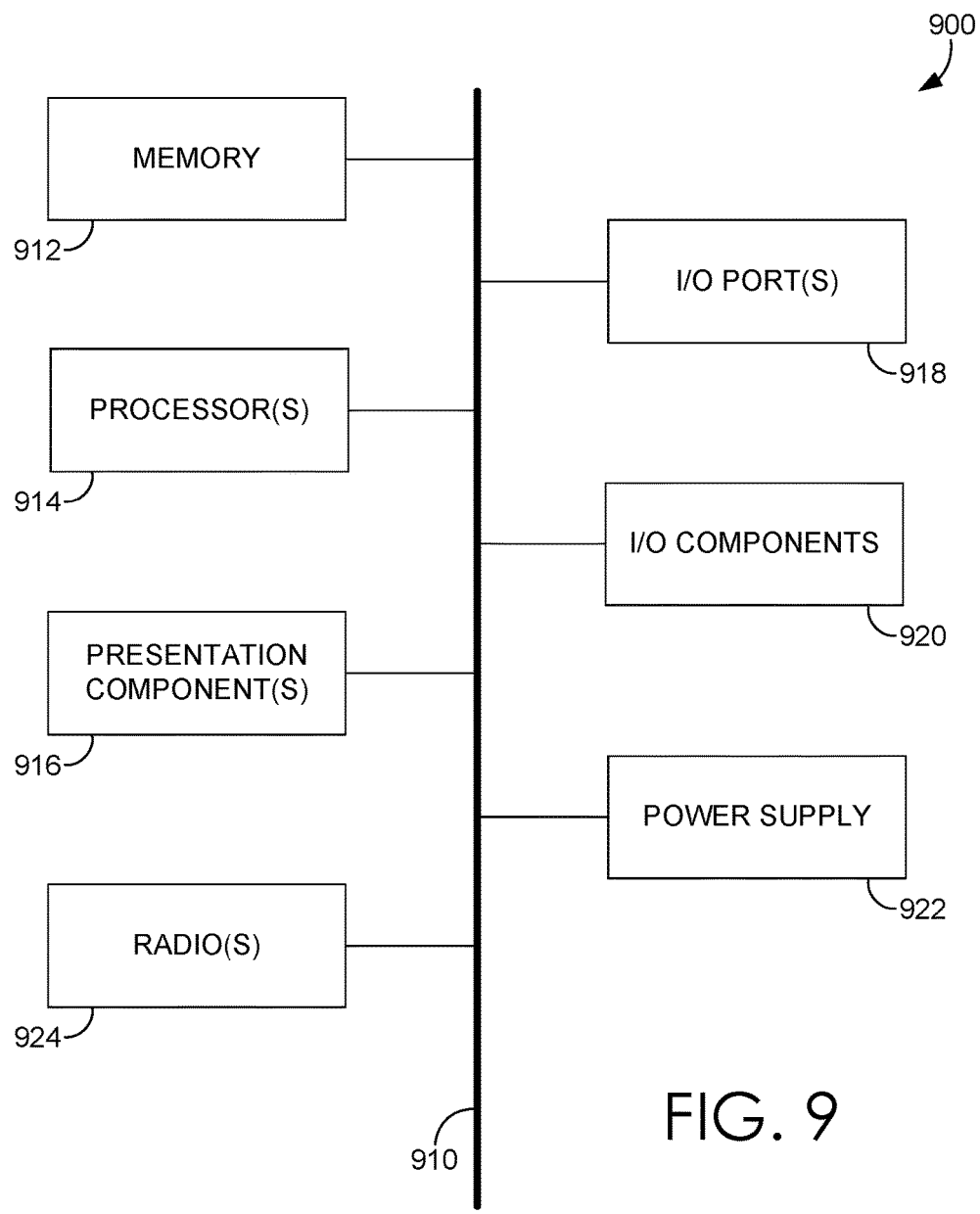
FIG. 9 is a block diagram of an exemplary computing environment suitable for use in implementations of the present disclosure.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As described above, implementations of the present disclosure relate to techniques for obtaining biometric signatures for electronically signing digital documents. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for facilitating cross-device transactions, the method comprising:
   receiving, by a host client device, a request to enable a digital document to be electronically annotated by a remote client device while the digital document is maintained on the host client device;
   sending, by the host client device to a remote server device, a piece of digital document metadata corresponding to and apart from the digital document maintained on the host client device, wherein the remote server device is configured to receive, based at least in part on a selection that corresponds to the piece of digital document metadata displayed by the remote client device, at least a first electronic annotation from the remote client device for association with the corresponding digital document maintained on the host client device;
   receiving, from the remote server device, at least the first electronic annotation received from the remote client device for association with the digital document maintained on the host client device; and
   associating, by the host client device, at least the first electronic annotation received from the remote server device with the digital document maintained on the host client device.

2. The method of claim 1, wherein the piece of digital document metadata includes at least one of a document name, a document size, and a document modification timestamp.

3. The method of claim 1, wherein an electronic annotation of at least the first electronic annotation includes one of an electronic signature, a predefined comment, and a customizable comment.

4. The method of claim 1, wherein the piece of digital document metadata provided for display on the remote client device is included in a list comprising at least one additional piece of digital document metadata, wherein an additional piece of digital document metadata of the at least one additional piece of digital document metadata corresponds to another digital document that is enabled by the host client device to be electronically annotated.

5. The method of claim 1, wherein the remote server device is further configured to receive the at least one electronic annotation based at least in part on a touch input detected by the remote client device.

6. The method of claim 5, wherein the touch input corresponds to one of a predefined electronic annotation stored in a memory, a customizable electronic annotation, and a handwritten electronic annotation.

7. The method of claim 1, wherein associating at least the first electronic annotation with the digital document includes:
   a superimposition of at least the first electronic annotation to a corresponding portion of the digital document defined in the piece of digital document metadata.

8. The method of claim 7, wherein the request to enable the digital document to be electronically annotated by the remote client device is based at least in part on a digital document viewing application on the host client device being associated with a user account stored on the remote server device, and wherein the piece of digital document metadata is displayed by the remote client device based at least in part on another application on the remote client device being associated with the user account.

9. A non-transitory computer storage medium storing computer-useable instructions that, when used by one or more computing devices, cause the one or more computing devices to perform operations comprising:
   establishing, by a remote client device, an authenticated network connection with a remote server device;
   receiving, from the remote server device via the authenticated network connection, at least a first piece of digital document metadata, wherein at least the first piece of digital document metadata is received apart from a corresponding digital document maintained on the host client device, and wherein the corresponding digital document is enabled by the host client device to be electronically annotated from the remote client device;
   receiving, by the remote client device, a selection that corresponds to the first piece of digital document metadata;
   based at least in part on the received selection, providing for display by the remote client device, a widget to obtain at least a first electronic annotation for association with the corresponding digital document maintained on the host client device; and
   sending, to the remote server device via the authenticated network connection, at least the obtained first electronic annotation, wherein the remote server device is configured to communicate at least the obtained first electronic annotation to the host client device for association with the corresponding digital document maintained thereon.

10. The medium of claim 9, wherein a piece of digital document metadata of at least the first piece of digital document metadata includes at least one of a document name, a document size, and a document modification timestamp.

11. The medium of claim 9, further comprising:
   providing for display, by the remote client device, a list that includes at least the first piece of digital document metadata.

12. The medium of claim 11, wherein at least the first piece of digital document metadata included in the list is accompanied with a corresponding button to initiate the widget.

13. The medium of claim 9, wherein the authenticated network connection is established based on an application, employed by the remote client device being associated with a user account stored on the remote server device.

14. The medium of claim 9, wherein the operations are performed based at least in part on an application, employed by the remote client device, being associated with a user account stored on the remote server device.

15. The medium of claim 14, wherein the operations are performed based further in part on a document viewer application, employed by the host client device, being associated with the user account.

16. A computerized system comprising:
at least one processor; and
at least one computer storage media storing computer-usable instructions that, when used by the at least one processor, cause the at least one processor to:
receive, by a server device, a piece of digital document metadata from a host client device, wherein the piece of digital document metadata is received apart from a corresponding digital document maintained on the host client device;
send, to a remote client device, at least the piece of digital document metadata received from the host client device;
receive, from the remote client device, at least a first electronic annotation for association with the corresponding digital document maintained on the host client device, wherein the remote client device is configured to send at least the first electronic annotation to the server device, based at least in part on a selection that corresponds to the piece of digital document metadata displayed by the remote client device; and
send, to the host client device, at least the first electronic annotation received from the remote client device, for association with the corresponding digital document maintained thereon.

17. The system of claim 16, wherein the piece of digital document metadata includes at least one of a document name, a document size, and a document modification timestamp.

18. The system of claim 16, wherein the host client device is configured to send the piece of digital document metadata to the server device in response to a request to enable the corresponding digital document to be electronically annotated being recieved from at least the remote client device while the corresponding digital document is maintained on the host client device.

19. The system of claim 16, wherein the remote client device is configured to provide for display a list that includes the piece of metadata received from the host client device, and is further configured to receive the selection that corresponds to the piece of metadata included in the displayed list.

20. The system of claim 19, wherein the instructions further cause the at least one processor to:
send, to the remote client device, additional pieces of metadata that are associated with additional corresponding digital documents enabled to be electronically annotated from at least the remote client device, and
wherein the list further includes the additional pieces of metadata.

\* \* \* \* \*